(12) United States Patent
Webb, Jr. et al.

(10) Patent No.: US 6,374,344 B1
(45) Date of Patent: Apr. 16, 2002

(54) METHODS AND APPARATUS FOR PROCESSING LOAD INSTRUCTIONS IN THE PRESENCE OF RAM ARRAY AND DATA BUS CONFLICTS

(75) Inventors: David Arthur James Webb, Jr., Groton; James B. Keller, Waltham, both of MA (US); Derrick R. Meyer, Austin, TX (US)

(73) Assignee: Compaq Information Technologies Group L.P. (CITG), Houston, TX (US)

( * ) Notice: Subject to any disclaimer, the term of this patent is extended or adjusted under 35 U.S.C. 154(b) by 0 days.

(21) Appl. No.: 09/200,248

(22) Filed: Nov. 25, 1998

(51) Int. Cl.$^7$ ................................................ G06F 12/08
(52) U.S. Cl. ........................ 712/205; 712/207; 711/118
(58) Field of Search ................................ 712/205, 207, 712/233; 711/113, 117–129, 137–144, 169, 167

(56) References Cited

U.S. PATENT DOCUMENTS

| | | | | |
|---|---|---|---|---|
| 5,418,973 A | * | 5/1995 | Ellis et al. ...................... | 712/3 |
| 5,564,034 A | * | 10/1996 | Miyake ....................... | 711/128 |
| 5,564,118 A | | 10/1996 | Steely, Jr. et al. .......... | 395/375 |
| 5,717,896 A | * | 2/1998 | Yung et al. .................. | 712/205 |
| 5,828,860 A | * | 10/1998 | Miyaoku et al. ............. | 712/207 |

OTHER PUBLICATIONS

Yeh, Tse–Yu, and Patt, Yale N., "Two–Level Adaptive Training Branch Prediction," Association for Computing Machinery, 0–89791–460–0/91/0011/0051, 1991.

Keller, Jim, "The 21264: A Superscalar Alpha Processor with Out–of–Order Execution," Digital Semiconductor, Digital Equipment Corp., Hudson, MA, no date given.

Gieseke, Bruce A., et al., "A 600 MHz Superscalar RISC Microprocessor With Out–of–Order Execution," Digital Semiconductor, Digital Equipment Corporation, Hudson, MA, no date given.

Gwennap, Linley, "Digital 21264 Sets New Standard: Clock Speed, Complexity, Performance Surpass Records, But Still a Year Away," *Microprocessor Report*, 10(14), Oct. 28, 1996.

Gieseke, Bruce A., et al., "FA 10.7: A 600 MHZ Superscalar RISC Microprocessor with Out–of–Order Execution." Paper presented at the *1997 IEEE International Solid–State Circuits Conference*, 0–7803–3721–2/97.

Emer, Joel, and Gloy, Nikolas, "A Language for Describing Predictors and Its Application to Automatic Synthesis," *Proceedings of the 24th Annual International Symposium on Computer Architecture*, Denver, CO, Jun. 2–4, 1997.

Johnson, Mike, "The Role of Exception Recovery." In *Superscalar Microprocessor Design* (New Jersey:PTR Prentice Hall), pp. 87–102, 1991.

\* cited by examiner

*Primary Examiner*—Zarni Maung
*Assistant Examiner*—Wei-Tai Lin
(74) *Attorney, Agent, or Firm*—Hamilton, Brook, Smith & Reynolds, P.C.

(57) ABSTRACT

A technique handles load instructions within a data processor that includes a cache circuit having a data cache and a tag memory indicating valid entries within the data cache. The technique involves writing data to the data cache during a series of four processor cycles in response to a first load instruction. Additionally, the technique involves updating the tag memory and preventing reading of the tag memory in response to the first load instruction during a first processor cycle in the series of processor cycles. Furthermore, the technique involves reading tag information from the tag memory during a processor cycle of the series of four processor cycles following the first processor cycle in response to a second load instruction.

16 Claims, 6 Drawing Sheets

METHODS AND APPARATUS FOR PROCESSING LOAD INSTRUCTIONS IN THE PRESENCE OF RAM ARRAY AND DATA BUS CONFLICTS

FIELD OF THE INVENTION

This invention relates generally to data processing and in particular to techniques for processing load instructions in the presence of resource conflicts within a data processor.

BACKGROUND OF THE INVENTION

A typical load instruction instructs a data processor to retrieve data from memory. In general, such a load instruction identifies a memory location that stores the data. When the processor processes the load instruction, the processor typically checks tag information corresponding to the identified memory location to determine whether the data resides in an internal data cache. If the tag information indicates that the data resides in the data cache (a cache hit), the processor uses the data from the data cache. On the other hand, if the tag information indicates that the data is not in the data cache (a cache miss), the processor retrieves the data from an external or off-chip memory (e.g., a secondary cache, main memory or disk memory). In general, data retrieval is faster from the data cache than from the external memory.

Some processor designers have attempted to minimize the amount of time needed to retrieve data from the data cache in order to make the data available to the processor for further processing as quickly as possible. To this end, designers have designed some processors with dedicated memory circuits called tag stores for storing tag information. In general, such tag stores have access times similar to those of data caches.

Typically, when a processor using a tag store encounters a load instruction within an instruction stream, the processor simultaneously (i) checks tag information from the tag store, and (ii) reads data from the data cache through a primary data bus. If the tag information indicates that the retrieved data is valid (a cache hit), the data is available to the processor immediately for further processing.

Conversely, if the tag information indicates that the retrieved data is invalid (a cache miss), the processor ignores the data from the data cache, and performs additional retrieval steps to obtain the data from another memory (e.g., off-chip memory). In particular, the processor sends out a request to the other memory for the data. In response, the other memory provides the requested data to the data cache through the primary data bus, updates the tag information in the tag store and notifies the processor that the data is now available. The processor then obtains and uses the data.

SUMMARY OF THE INVENTION

In general, when a processor processes multiple load instructions, some load instructions will result in cache hits and some will result in cache misses. When data arrives from another memory through the primary data bus in response to a cache miss, the primary data bus and the data cache become temporarily unavailable. This unavailability temporarily prevents the processor from processing any further load instructions in the instruction stream (or pipeline). That is, the processor delays processing further load instructions (i.e., simultaneously checking the tag information in the tag store and reading data from the data cache) until the cache miss is satisfied (i.e., until the primary data bus and the data cache are again available).

It is expensive to delay load instructions within an instruction stream of a processor since such delays cause processor resources (e.g., fetch and execution circuitry) to go underutilized. Moreover, such delays effectively delay other non-load instructions within the instruction stream which depend on data to be retrieved by the delayed load instructions.

Additionally, when a cache miss occurs, the retrieved data is typically more than just the data identified by the load instruction. Rather, a block of data is generally provided during multiple processor cycles to fulfill any subsequent load instructions for data adjacent to the retrieved data. Such activity extends the amount of time that the data cache and the primary data bus are unavailable, and the amount of time the subsequent load instructions must be delayed.

Furthermore, there is a tendency for cache misses to occur in bursts (i.e., when one cache miss occurs, other cache misses are likely). Accordingly, when a first cache miss occurs in response to an initial load instruction, there is a strong probability that arrival of data in the data cache through the primary data bus in response to the initial load instruction will delay one or more other load instructions ready for processing by the processor.

In contrast, an embodiment of the invention is directed to a technique for handling load instructions within a data processor that includes a cache circuit having a data cache and a tag memory indicating valid entries within the data cache. The technique involves writing data to the data cache in response to a first load instruction. The technique further involves reading tag information from the tag memory in response to a second load instruction while data is written to the data cache. Accordingly, the processor is able to process the second load instruction regardless of data cache and primary data bus availability.

If the tag information indicates that the data identified by the second load instruction is in the data cache (a cache hit), the data cache provides the identified data to the processor in response to the second load instruction after data is written to the data cache in response to the first load instruction. On the other hand, if the tag information indicates that the data identified by the second load instruction is not in the data cache (a cache miss), the processor requests the data from another memory. In either situation, it is of no consequence that a processor resource such as the data cache or the primary data bus is unavailable when processing the second load instruction.

Preferably, writing data to the data cache occurs over multiple processor cycles. In this situation, the technique involves updating the tag memory during a particular one of the multiple processor cycles in response to the first load instruction. Furthermore, reading the tag information in response to the second load instruction occurs during another one of the multiple processor cycles that is different than the particular one of the multiple processor cycles. For example, the multiple processor cycles may form a series of four processor cycles. Updating of the tag information may occur during a first processor cycle in the series, and reading the tag information may occur during one of the subsequent processor cycles in the series.

Preferably, when data is written to the data cache in response to the first load instruction, the processor continuously provides a particular address of the data cache to an address input of the cache circuit until writing data to the data cache completes. Accordingly, the data is written to the data cache based on the particular address without interference from other addresses that processor may provide when processing other load instructions such as the second load instruction.

Preferably, the processor processes a load instruction by accessing the tag memory and the data cache simultaneously when both are available at the same time. For example, to process a third load instruction, the processor reads tag information from the tag memory and simultaneously reads data from the data cache.

BRIEF DESCRIPTION OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

Figure 1:
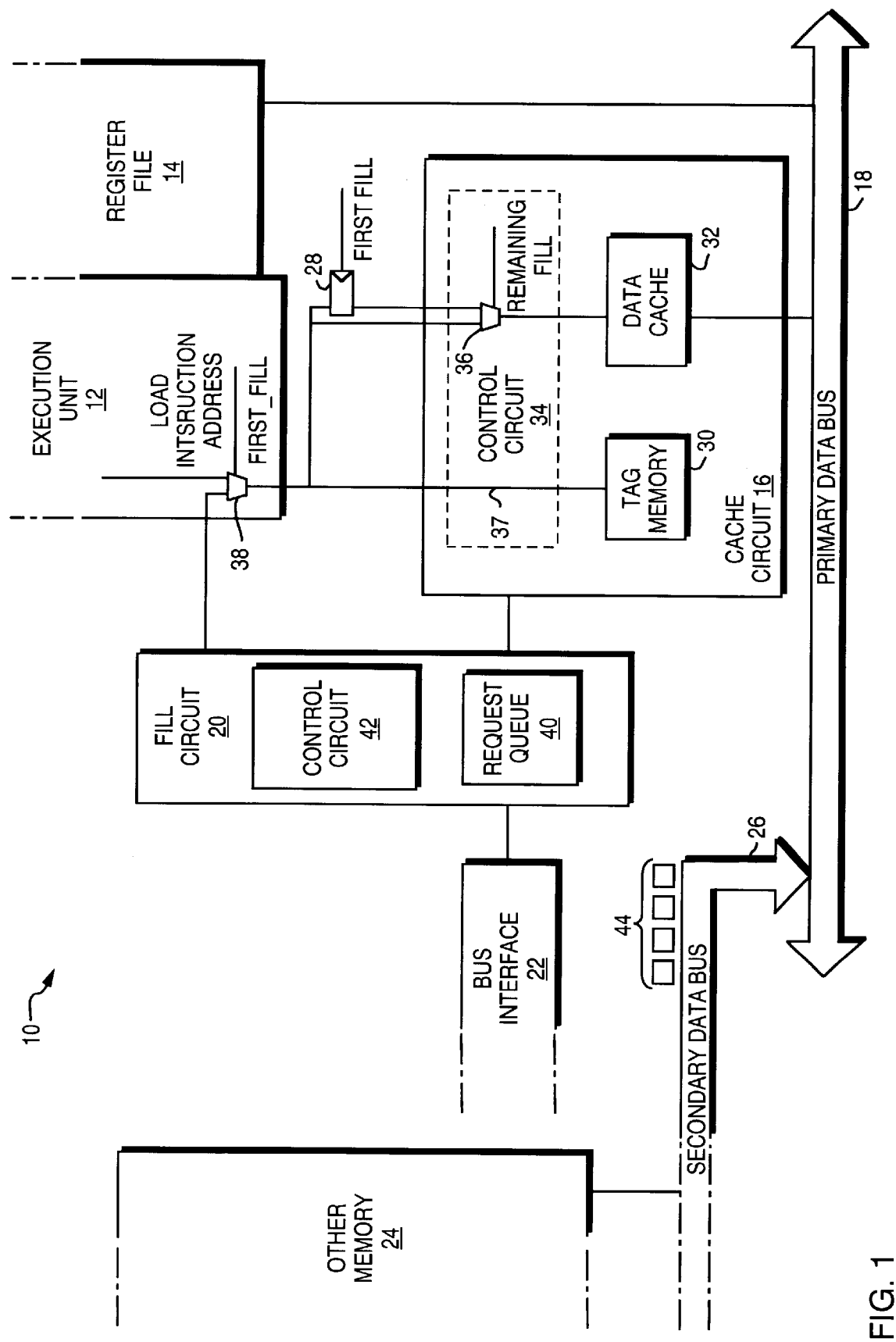
FIG. 1 is a block diagram of data processing circuitry for handling load instructions according to the invention.

An embodiment of the invention is directed to a technique that enables data processing circuitry to process a load instruction regardless of data cache and primary data bus availability. As shown in FIG. 1, such data processing circuitry 10 includes an execution unit 12, a register file 14, a cache circuit 16, a primary data bus 18, a fill circuit 20, a bus interface 22, a memory 24 (e.g., a secondary cache, main memory or disk memory), a secondary data bus 26 and a latch circuit 28. Preferably, the execution unit 12, the register file 14, the cache circuit 16, the fill circuit 20, and the latch circuit 28 are integrated with other circuits in an integrated circuit (IC) device, and the memory 24 is external to the IC device.

The cache circuit 16 includes a tag memory 30, a data cache 32 and a control circuit 34. The control circuit 34 includes a multiplexer 36 and a pass-through connection 37. The execution unit 12 also includes a multiplexer 38. The connection 37 couples the tag memory 30 with an output of the multiplexer 38. The multiplexer 36 selectively couples the data cache 32 with the output of the multiplexer 38 and an output of the latch circuit 28.

The fill circuit 20 includes a request queue 40 and a control circuit 42. The request queue 40 tracks requests to retrieve data from the memory 24. To satisfy such requests, the memory 24 provides the requested data to the data cache 32 through the secondary data bus 26 and the primary data bus 18.

Figure 2:
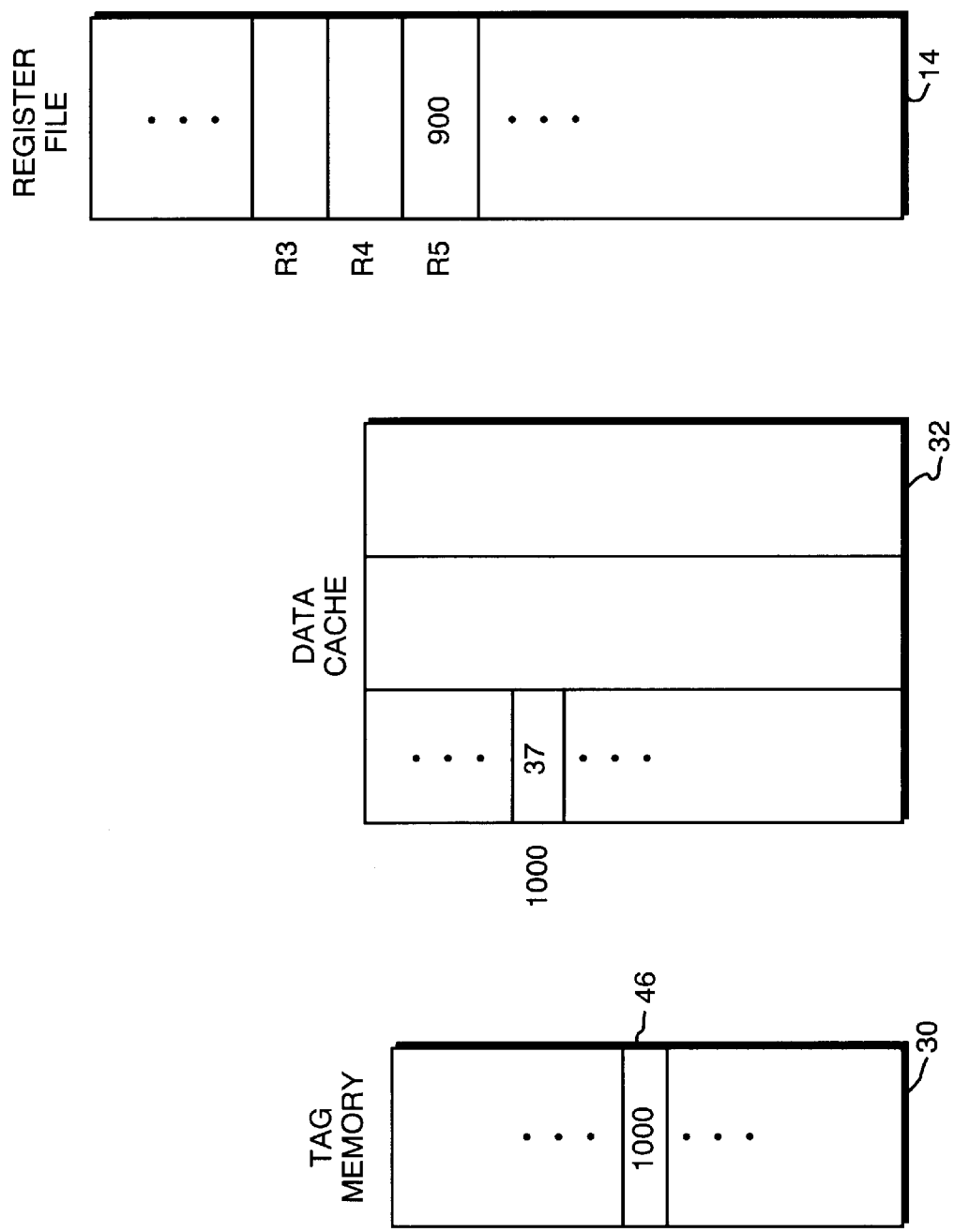
FIG. 2 is a block diagram of a tag memory, a data cache and a register file of the data processing circuitry of FIG. 1.

The tag memory 30 includes multiple entries (e.g., tag memory entry 46), as shown in FIG. 2. Similarly, the data cache 32 includes multiple memory location entries (e.g., a memory location entry corresponding to a memory address 1000 and storing a value "37"), as shown in FIG. 2. Preferably, the data cache 32 is a random access memory (RAM) array. Furthermore, the register file 14 includes multiple general purpose registers (e.g., general purpose registers R3, R4 and R5), as shown in FIG. 2.

Figure 3:
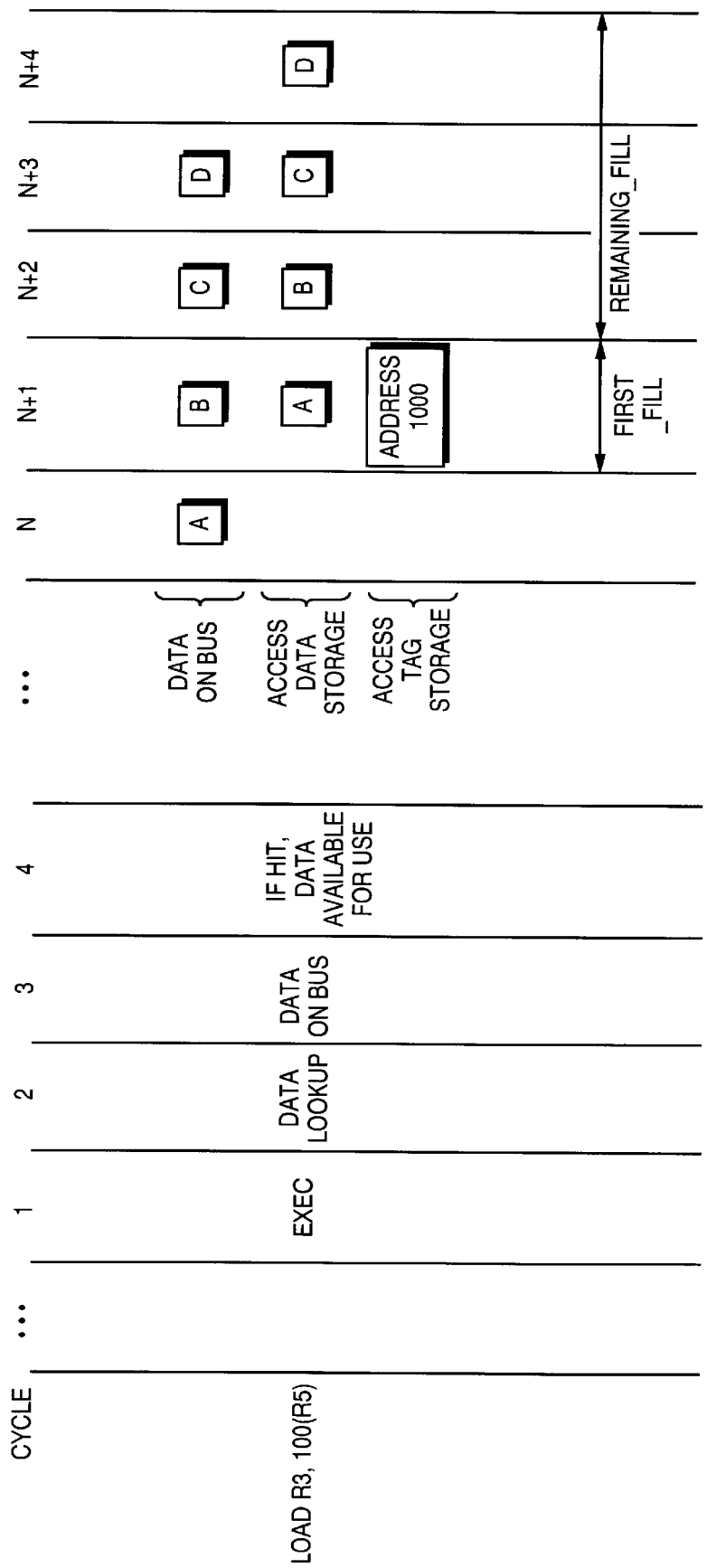
FIG. 3 is a timing diagram for a load instruction processed by the data processing circuitry of FIG. 1.

A general explanation of how the data processing circuitry 10 processes a load instruction when all of the processor resources are available (e.g., the tag memory 30, the data cache 32 and the primary data bus 18) will now be provided with reference to FIG. 3. In CYCLE 1, the execution unit 12 determines that an instruction within the pipeline is a load instruction (e.g., LOAD R3, 100(R5)). In CYCLE 2, the execution unit 12 sends an address identifying data to be retrieved by the load instruction to the cache circuit 16. In CYCLE 3, the cache circuit 16 provides data stored within the data cache 32 that corresponds to the address through the primary data bus 18 to the register file 14. Simultaneously, the control circuit 34 of the cache circuit 16 checks the tag memory 30 to determine whether the data provided by the data cache 32 is valid. If the data is valid (a cache hit), the data is available for in the register file 14 for use in CYCLE 4. If the data is not valid (a cache miss), the cache circuit 16 signals the execution unit 12 that the data must be retrieved from the memory 24.

To obtain the data from the memory 24, the cache circuit 16 signals the fill circuit 20. In response, the control circuit 42 of the fill circuit 20 sends a data request to the bus interface circuit 22 and logs the data request in the request queue 40. The bus interface 22 then retrieves a block of data 44 (including the data from the identified memory location) from the memory 24. The block of data 44 arrives in multiple portions over multiple processor cycles. Preferably, the block of data 44 includes four portions A, B, C and D that arrive through the primary data bus 18 during CYCLES N, N+1, N+2 and N+3, respectively (N being one or more cycles after CYCLE 4). Each portion of the block of data 44 is stored in the data cache 32 one cycle later (i.e., with one cycle of latency). In particular, portions A, B, C and D are written into the data cache 32 in CYCLES N+1, N+2, N+3 and N+4, respectively.

As the block of data 44 arrives from the memory 24, the data processing circuitry 10 properly updates the tag information in the tag memory 30 and properly stores the block of data 44 in the data cache 32 such that it replaces invalid data. In particular, as the block of data 44 reaches the secondary data bus 26, the bus interface 22 detects the arrival and signals the fill circuit 20. In response, the fill circuit 20 sends a memory address for the arriving block of data 44 to the execution unit 12. Additionally, the fill circuit 20 outputs a first_fill signal which identifies an initial cycle for writing data into the data cache 32 (CYCLE N+1), and a remaining_fill signal which identifies subsequent cycles for writing data into the data cache 32 (CYCLES N+2, N+3 and N+4).

The first_fill signal signals the multiplexer 38 of the execution unit 12 to provide the memory address of the arriving block of data 44 to the cache circuit 16. The memory address passes through the connection 37 of the control circuit 34 to the tag memory 30 to update the tag information within the tag memory 30 (also see CYCLE N+1 of FIG. 3). The tag memory 30 then reflects the storage of the block of data 44 in the data cache 32.

At the same time, the memory address reaches the latch circuit 28 and the multiplexer 34. The latch circuit 28, under control of the first_fill signal from the fill circuit 20, latches and holds the memory address. The remaining_fill signal from the fill circuit 20 operates the multiplexer 36 of the control circuit 34 such that it continuously provides the memory address to the data cache 32 to enable the data cache 32 to properly store the arriving block of data 44 in CYCLES N+1, N+2, N+3 and N+4. After the block of data 44 is stored in the data cache 32, the execution unit 12 accesses the data cache 32 to satisfy the load instruction.

Figure 4:
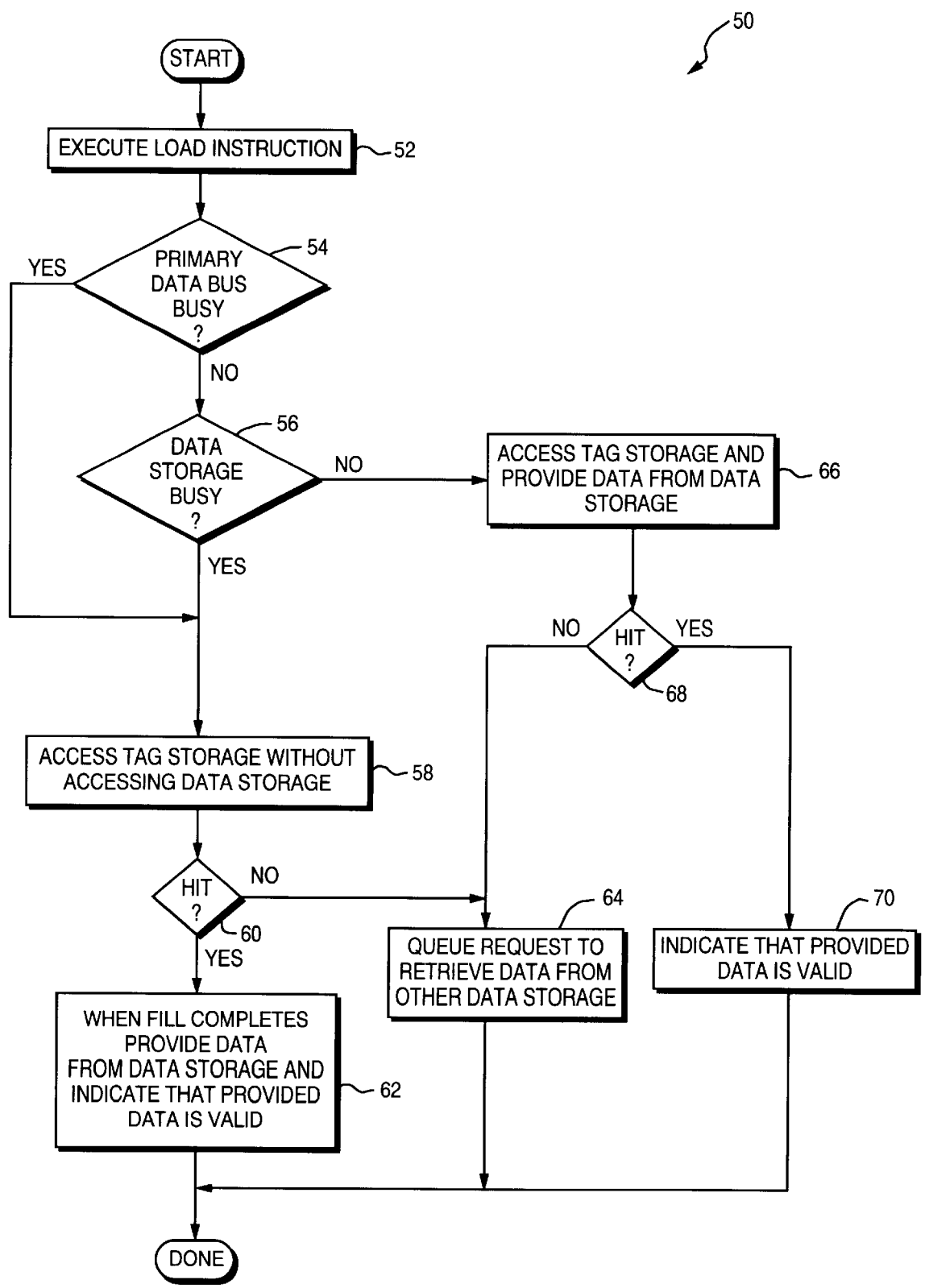
FIG. 4 is a flow diagram of a procedure performed by the data processing circuitry of FIG. 1.

Further details of the operation of the data processing circuitry 10 will now be provided with reference to a flow diagram shown in FIG. 4. The flow diagram illustrates a procedure 50 performed by the data processing circuitry 10. In step 52, the execution unit 12 detects a load instruction within the instruction stream or pipeline (also see CYCLE 1 in FIG. 3). In step 54, the control circuit 34 of the cache circuit 16 determines whether the primary data bus 18 will be busy in the next processor cycle. If the primary data bus will be busy in the next processor cycle, step 54 proceeds to step 58. If the primary data bus will not be busy in the next processor cycle, step 54 proceeds to step 56.

In step 56, the control circuit 34 determines whether the data cache 32 is presently busy (i.e., whether data is being written into the data cache 32). If the data cache 32 is available (i.e., no fill in progress), step 54 proceeds to step 66. If the data cache 32 is not available (i.e., a fill is in progress), step 56 proceeds to step 58.

In step 58, the control circuit 34 waits until the tag memory 30 is available (since the tag memory 30 cannot be accessed if it is being updated to reflect the presence of incoming data from the memory 24), and then accesses tag information within the tag memory 30 without accessing the data cache 32. In step 60, the control circuit 34 checks the tag information to determine whether the data identified by the load instruction exists in the data cache 32. If the tag information indicates that the data does not exist in the data cache 32 (a cache miss), step 60 proceeds to step 64, which involves the control circuit 34 signaling the fill circuit 20 to retrieve the data from the memory 24. If the tag information indicates that the data exist in the data cache 32 (a cache hit), step 60 proceeds to step 62 which involves transferring the identified data from the data cache 32 to the register file 14 when the data cache 32 becomes available. Accordingly, regardless of whether a cache hit or a cache miss occurs, the data processing circuitry 10 is able to process the load instruction while the data cache 32 is unavailable.

In step 66, which follows step 54 when the data cache 32 is available, the control circuit 34 accesses the tag memory 30 and the data cache 32 simultaneously (see CYCLE 2 in FIG. 3). In step 68, the control circuit 34 checks the tag information in the tag memory 30 to determine whether the data resides in the data cache 32, while the data is transferred to the register file 14 (CYCLE 3). If the data resides in the data cache 32, step 68 proceeds to step 70 which involves indicating to the execution that the data is available for use (CYCLE 4). If the data does not reside in the data cache 32, step 68 proceeds to step 64 which involves signaling the fill circuit 20 to retrieve the data from the memory 24.

It should be understood that the failure to access the data cache 32 in step 58 is of no consequence. If the data is not in the data cache 32, a cache miss is the result regardless of whether the data cache 32 is accessed. If the data is in the data cache 32, the data is transferred from the data cache 32 to the register file 14 when the data cache 32 becomes available.

By way of a first example, suppose that the execution unit 12 encounters the following load instruction in the pipeline:

LOAD R3, 100(R5)

(see step 52 in FIG. 4). This load instruction instructs the data processing circuitry 10 to load general purpose register R3 within the register file 14 with data from the data cache 32 corresponding to a memory location of the memory 24 that is specified by general purpose register R5 (e.g., 900 as shown in FIG. 2) plus 100. That is, the load instruction instructs the data processing circuitry 10 to load general purpose register R3 with data corresponding to memory location 1000 (900 plus 100). If the primary data bus 18 will be available in the next processor cycle (step 54) and if the data cache 32 is available (step 56), the execution unit 12 accesses the tag memory 30 and the data cache 32 simultaneously (step 66). Accordingly, the data cache 32 provides data (e.g. "37", see FIG. 2) corresponding to memory location 1000 to general purpose register R3 of the register file 14, and the control circuit 34 checks the tag memory 30 for an entry storing the value 1000 (step 68). If the tag memory 30 stores the value 1000 (a cache hit), the control circuit 34 signals the execution unit 12 that the data is in general purpose register R3 and available for use (step 70). If the tag memory 30 does not store the value 1000 (a cache miss), the control circuit 34 signals the fill circuit to retrieve a block of data including the data at memory location 1000 in the memory 24 (step 64).

However, if the primary data bus 18 will be busy in the next processor cycle (step 54) or the data cache 34 is busy (step 56), the execution unit 12 waits for the tag memory 30 to become available and accesses the tag memory 30 without accessing the data cache 32 (step 58) to determine whether the identified data resides in the data cache 32 (step 60). If the data is not in the data cache 32, the control circuit 34 signals the fill circuit 20 to retrieve a block of data including the data at memory location 1000 in the memory 24 (step 64). On the other hand, if the data is in the data cache 32, the data cache 32 provides the data to the register file 14 at a later time (step 62). Nevertheless, the data processing circuitry 10 is able to process the example load instruction regardless of the availability of the data cache 32 and the primary data bus 18.

Figure 5:
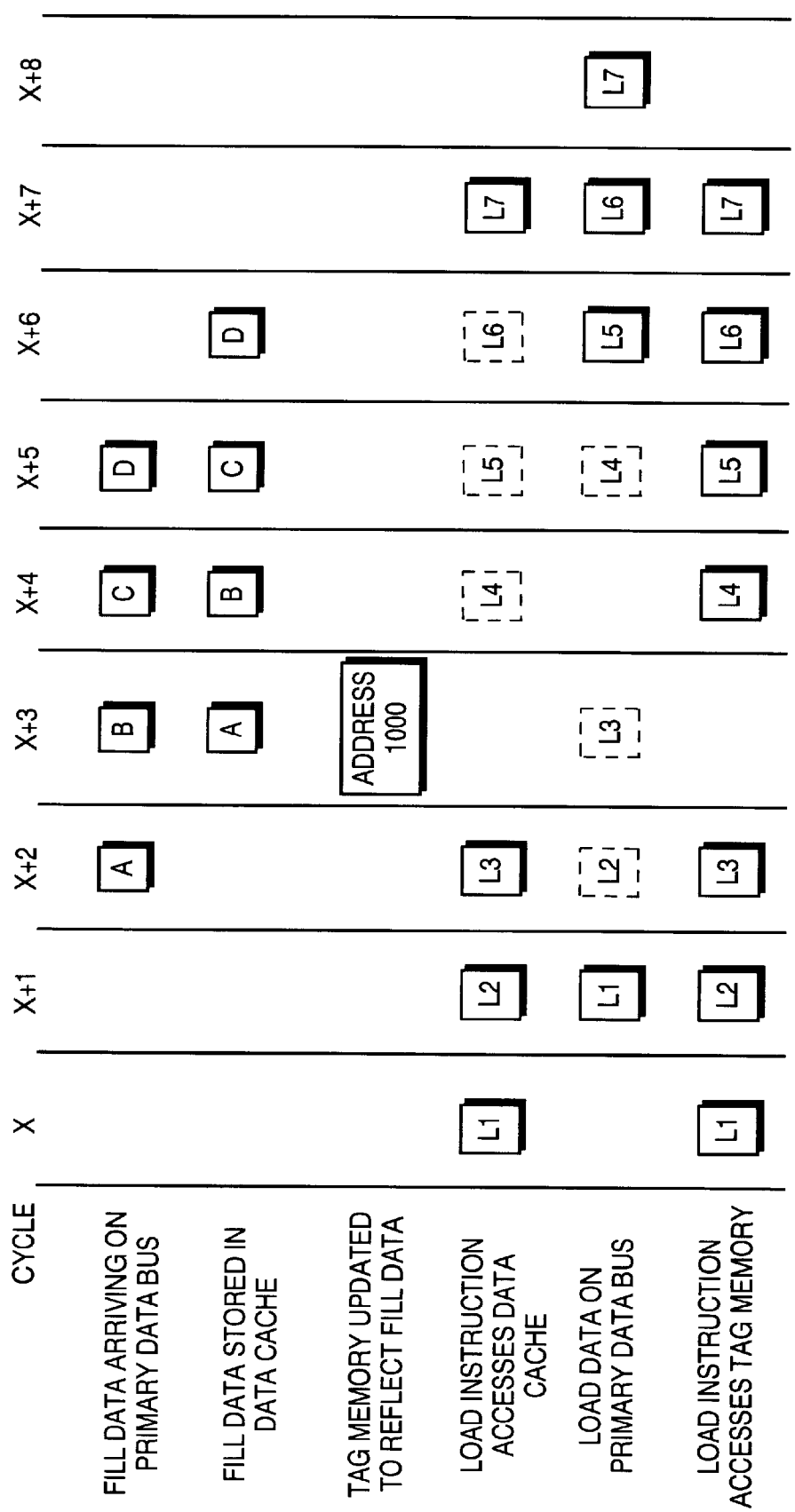
FIG. 5 is a timing diagram for load instructions processed by the data processing circuitry of FIG. 1 when a block of data arrives at a data cache through a primary data bus.

Reference is now made to FIG. 5 which shows, by way of a second example, a block of data (portions A, B, C and D) arriving from the memory 24 through the primary data bus 18 during processor cycles X+2, X+3, X+4 and X+5 (X being an integer). The data cache 32 stores the block of data with one cycle of latency, i.e., during processor cycles X+3, X+4, X+5 and X+6. Additionally, the tag memory 30 updates its contents to reflect the presence of the block of data during processor cycle X+3.

As further shown in FIG. 5, the processing circuitry 10 processes a series of load instructions (instructions L1 through L7) during processing cycles X through X+8. In particular, for load instruction L1, the primary data bus 18 is available in CYCLE X+1 (step 54 in FIG. 4), and the data cache 32 and the tag memory 30 are both available in CYCLE X (step 56 in FIG. 4). Accordingly, the processing circuitry 10 processes load instruction L1 by simultaneously accessing the tag memory 30 and the data cache 32 during CYCLE X (step 66). Then, the data cache 32 provides data to the register file 14 through the primary data bus 18 in response to the load instruction L1 during CYCLE X+1.

For load instruction L2, the primary data bus 18 is not available in CYCLE X+2 due to the arrival of portion A on the primary data bus 18 (step 54), but the data cache 32 and the tag memory 30 are both available in CYCLE X+1 (step 56). Load instruction L2 is shown in CYCLE X+2 of FIG. 5 using dashed lines rather than solid lines to illustrate the potential conflict between arriving portion A on the primary data bus 18 and the desire for the data cache 32 to provide data in response to load instruction L2 through the primary data bus 18 in CYCLE X+2. To avoid such a conflict, the processing circuitry 10 processes load instruction L2 by accessing the tag memory 30 without accessing the data cache 32 in CYCLE X+1 (step 58). If the tag memory 30 indicates a cache miss, data is retrieved from the memory 34 in a standard fashion (step 64). If the tag memory 30 indicates a cache hit, the data cache 32 provides the data to the register file 14 when the data cache 32 becomes available (step 62). Hence, the processing circuitry 10 processes the load instruction L2 even when the primary data bus 18 is unavailable in the next processor cycle.

For load instruction L3, the primary data bus 18 is not available in CYCLE X+3 due to the arrival of portion B on the primary data bus 18 (step 54), but the data cache 32 and the tag memory 30 are both available in CYCLE X+2 (step 56). Accordingly, due to the potential primary data bus conflict, the processing circuitry 10 processes load instruction L2 by accessing the tag memory 30 without accessing the data cache 32 (step 58) in a manner similar to that for load instruction L2. Thus, the processing circuitry 10 processes the load instruction L2 even when the data cache 32 is presently unavailable and when the primary data bus 18 is unavailable during the next processor cycle.

In CYCLE X+3, the presence of portion C on the primary data bus 18 in CYCLE X+4, the storage of portion A in the data cache 32 in CYCLE X+3, and the updating of the tag memory 30 in CYCLE X+3, prevents the processing circuitry 10 from processing a load instruction. If one or more load instructions are ready for processing, the processing circuitry 10 delays processing until the tag memory 30 becomes available. Preferably, processor resource availability is determined several processor cycles ahead of time by control logic within the processing circuitry 10 (e.g. within the bus interface 22, the fill circuit 42 and the execution unit 12). Accordingly, the processing circuitry 10 is prepared to process a new load instruction as soon as the tag memory becomes available in CYCLE X+4.

For load instruction L4, the primary data bus 18 is not available in CYCLE X+5 due to the arrival of portion D on the primary data bus 18 (step 54), the data cache 32 is not available due to the data cache 32 storing portion B in CYCLE X+4 (step 56), and the tag memory 30 is available. Load instruction L4 is shown in CYCLE X+4 of FIG. 5 using dashed lines rather than solid lines to illustrate the potential conflict between the storage of portion B in the data cache 32 and the desire to access the data cache 32 in response to load instruction L4. To avoid such a conflict, the processing circuitry 10 processes load instruction L4 by accessing the tag memory 30 without accessing the data cache 32 (step 58) in a manner similar to that for load instruction L2.

For load instruction L5, the primary data bus 18 is available in CYCLE X+6 (step 54), the data cache 32 is not available due to the data cache 32 storing portion C in CYCLE X+5 (step 56), and the tag memory 30 is available. Accordingly, the processing circuitry 10 processes load instruction L5 by accessing the tag memory 30 without accessing the data cache 32 (step 58) in a manner similar to that for load instruction L2. Therefore, the processing circuitry 10 processes the load instruction L5 even when the data cache 32 is presently unavailable.

Similarly, for load instruction L6 in CYCLE X+6, the primary data bus 18 is available in CYCLE X+7 (step 54), the data cache 32 is not available in CYCLE X+6 due to the data cache 32 storing portion D (step 56), and the tag memory 30 is available. Accordingly, the processing circuitry 10 processes load instruction L6 by accessing the tag memory 30 without accessing the data cache 32 (step 58) in a manner similar to that for load instruction L5.

For load instruction L7, the primary data bus 18 is available in CYCLE X+8 (step 54), the data cache and the tag memory 30 are both available 32 in CYCLE X+7 (step 56). Accordingly, the processing circuitry 10 processes load instruction L7 by simultaneously accessing the tag memory 30 and the data cache 32 (step 66) in a manner similar to that for load instruction L1.

As shown by the second example, when the tag memory 30, the data cache 32 and the primary data bus 18 are all available, the processing circuitry 10 processes the load instructions by simultaneously accessing the tag memory 30 and the data cache 32 (e.g., load instructions L1 and L7). When the tag memory 30 is available but either the data cache 32 or the primary data bus 18 are unavailable (i.e., the data cache 32 during the current processor cycle or the primary data bus 18 during the next processor cycle), the processing circuitry 10 processes load instructions by accessing the tag memory 30 without accessing the data cache 32 (load instructions L2, L3, L4, L5 and L6). When the tag memory 30, the data cache 32 and the primary data bus 18 are unavailable, the processing circuitry 10 waits temporarily until the tag memory 30 becomes available before processing any ready load instructions.

Figure 6:
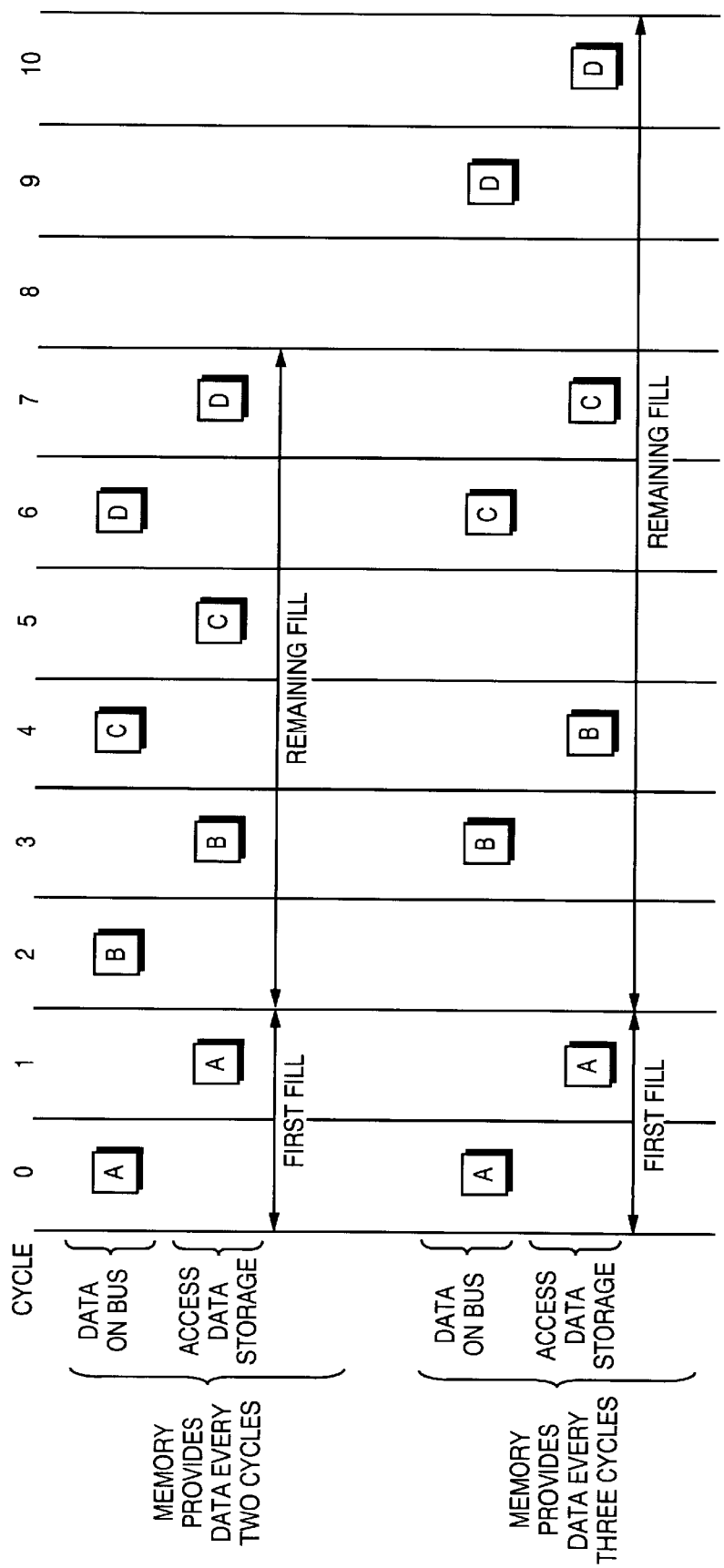
FIG. 6 are timing diagrams for load instructions processed by the data processing circuitry of FIG. 1 for various memory speeds.

It should be understood that not all external memories are capable of providing data at processor speeds. In particular, the memory 24 may not be capable of providing data to the data cache 32 during contiguous processor cycles. The data processing circuitry 10 is capable of handling arriving data at slower speeds, as shown in FIG. 6. In particular, a top timing diagram in FIG. 6 shows the operation of the data processing circuitry 10 when the memory 24 provides data every two cycles. The fill circuit 20 provides a first_fill signal during CYCLES 0 and 1 to enable the tag memory 30 and the data cache 32 to be updated properly. Then, the fill circuit 20 provides a remaining_fill signal during CYCLES 2 through 7 to enable the data cache 32 to properly store remaining portions of data.

A bottom timing diagram in FIG. 6 shows the operation of the data processing circuitry 10 when the memory 24 provides data every three cycles. Here, the fill circuit 20 still provides the first_fill signal during the first two cycles (CYCLES 0 and 1). The fill circuit 20 then provides the remaining_fill signal until the last data portion is written into the data cache 32 (during CYCLES 2 through 10). The data processing circuitry 10 is adaptable to operate at other speeds as well by configuring the fill circuit 20 to provide the first_fill and remaining_fill signals during the arrival of the first data portion (e.g., portion A) and subsequent data portions (e.g., portions B, C and D) respectively.

As described above, the data processing circuitry 10 handles loads while the data cache 32 is unavailable. Accordingly, the data processing circuitry 10 enables processing of load instructions as often as possible for optimal utilization of the data processing circuitry 10. Furthermore, conflicts between processor resources such as the data cache 32 and the tag memory 30 are minimized.

Equivalents

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the multiplexer 38 of the execution unit 12 and the multiplexer 36 of the control circuit 34 may be actual physical multiplexers. Alternatively, these multiplexers may represent logical operations performed by other circuitry that, as a whole, provides multiplexer functions.

Additionally, it should be understood that the memory 24 represents memory other than the data cache 32. The memory 24 may include multiple memory devices (e.g., a secondary data cache, main memory, disk memory, etc.) of various speeds. The data processing circuitry 10 can then be configured to operate to accommodate the various speeds as shown in FIG. 6.

What is claimed is:

1. A method for handling a sequence of load instructions within a data processor that includes a cache circuit having a data cache and a tag memory indicating valid entries within the data cache, and a fill circuit for storing blocks of data in the cache obtained from a main memory, the method comprising the steps of:
    in response to a first load instruction occurring in the sequence of load instructions,
    operating the fill circuit to fill a block of data in the data cache; and
    while the block of data is being filled to the data cache:
        determining if a second load instruction occurring in the sequence of load instructions has begun to be processed, the second load instruction not necessarily occurring immediately thereafter the first load instruction, and if so,
            reading tag information from the tag memory the tag information relating to a memory location reference in the second load instruction.

2. The method of claim 1 wherein the step of operating the fill circuit includes filling data using multiple processor cycles, and wherein the method further comprises the step of:
    updating the tag memory during a particular one of the multiple processor cycles in response to the first load instruction, and the step of reading tag information occurring during another one of the multiple processor cycles that is different than the particular one of the multiple processor cycles.

3. The method of claim 2 wherein the multiple processor cycles form a series of four processor cycles, wherein the particular one of the multiple processor cycles is a first processor cycle in the series of four processor cycles and wherein the other one of the multiple processor cycles is a processor cycle that occurs after the first processor cycle in the series of four processor cycles.

4. The method of claim 1 further comprising the step of:
    providing data from the data cache in response to the second load instruction after the step of filling data to the data cache completes.

5. The method of claim 1 further comprising the step of:
    continuously providing a particular address of the data cache to an address input of the cache circuit until the step of writing data to the data cache completes.

6. The method of claim 1 further comprising the step of:
    updating the tag memory during a particular processor cycle in response to the first load instruction, and preventing reading of the tag memory during the particular processor cycle such that the step of reading tag information occurs after the tag memory is updated.

7. The method of claim 1 further comprising the step of:
    reading tag information from the tag memory and simultaneously providing data from the data cache in response to a third load instruction occurring in the sequence of load instructions.

8. A circuit for handling load instructions within a data processor, comprising:
    a data cache;
    a tag memory indicating valid entries within the data cache; and
    a fill circuit, coupled to the data cache and the tag memory, that fills data to the data cache in response to a first load instruction, and
    a control circuit, to the tag memory and the data cache, and to control access to the tag memory such that while data is being filled to the data cache, tag information is read from the tag memory in response to a second load instruction, the second load instruction occurring in a sequence of load instructions after the first load instruction, but not necessarily immediately thereafter the first load instruction.

9. The circuit of claim 8 wherein the fill circuit includes:
    a control circuit that writes data to the data cache in response to the first load instruction during multiple processor cycles, updates the tag memory during a particular one of the multiple processor cycles in response to the first load instruction, and reads tag information from the tag memory during another one of the multiple processor cycles that is different than the particular one of the multiple processor cycles.

10. The circuit of claim 9 wherein the multiple processor cycles form a series of four processor cycles, wherein the particular one of the multiple processor cycles is a first processor cycle in the series of four cycles, and wherein the other one of the multiple processor cycles is a processor cycle that occurs after the first processor cycle in the series of four cycles.

11. The circuit of claim 8 wherein the fill circuit includes:
    a control circuit that provides data from the data cache in response to the second load instruction after data is written to the data cache in response to the first load instruction.

12. The circuit of claim 8 further comprising:
    a latch circuit, coupled to the fill circuit and the data cache, that continuously provides a particular address of the data cache to an address input of the cache circuit while the fill circuit writes data to the data cache in response to the first load instruction.

13. The circuit of claim 8 wherein the fill circuit includes:
    a control circuit that updates the tag memory during a particular processor cycle in response to the first load instruction, and prevents reading of the tag memory during the particular processor cycle such that tag information is read from the tag memory in response to the second instruction after the tag memory is updated.

14. The circuit of claim 8 wherein the fill circuit includes:
    a control circuit that reads tag information from the tag memory and simultaneously provides data from the data cache in response to a third load instruction.

15. A method for handling load instructions within a data processor that includes a cache circuit having a data cache and a tag memory indicating valid entries within the data cache, the method comprising the steps of:
    filling data to the data cache during a series of four processor cycles in response to a first load instruction;

during a first processor cycle in the series of four processor cycles, updating the tag memory and preventing reading of the tag memory in response to the first load instruction; and in response to a second load instruction,
reading tag information from the tag memory during a processor cycle of the series of four processor cycles following the first processor cycle.

16. A circuit for handling load instructions within a data processor, comprising:

a data cache;

a tag memory indicating valid entries within the data cache; and a fill circuit, coupled to the data cache and the tag memory, that:
fills data to the data cache during a series of four processor cycles in response to a first load instruction,
during a first processor cycle in the series of four processor cycles, updates the tag memory and prevents reading of the tag memory in response to the first load instruction, and
in response to a second load instruction, reads tag information from the tag memory during a processor cycle of the series of four processor cycles following the first processor cycle.

* * * * *